(12) United States Patent
Justis et al.

(10) Patent No.: US 6,925,811 B2
(45) Date of Patent: Aug. 9, 2005

(54) HIGH TEMPERATURE COMBUSTOR WALL FOR TEMPERATURE REDUCTION BY OPTICAL REFLECTION AND PROCESS FOR MANUFACTURING

(75) Inventors: Nicole Justis, San Diego, CA (US); John F. Ackermann, Laramie, WY (US); Paul V. Arszman, Cincinnati, OH (US); Bangalore A. Nagaraj, West Chester, OH (US); Craig D. Young, Maineville, OH (US)

(73) Assignee: General Electric Company, Schenectady, NY (US)

( * ) Notice: Subject to any disclaimer, the term of this patent is extended or adjusted under 35 U.S.C. 154(b) by 201 days.

(21) Appl. No.: 10/335,442

(22) Filed: Dec. 31, 2002

(65) Prior Publication Data

US 2004/0123598 A1 Jul. 1, 2004

(51) Int. Cl.[7] .............................................. F23M 5/00
(52) U.S. Cl. ......................................... 60/753; 428/622
(58) Field of Search ................. 60/775, 753; 106/286.5; 205/97; 427/431, 585, 376.6; 428/615, 622, 660, 698

(56) References Cited

U.S. PATENT DOCUMENTS

| | | | |
|---|---|---|---|
| 3,958,416 A | | 5/1976 | Hammond, Jr. et al. |
| 3,975,900 A | | 8/1976 | Pfefferle |
| 4,458,481 A | | 7/1984 | Ernst |
| 4,907,487 A | | 3/1990 | Tidman et al. |
| 4,942,732 A | | 7/1990 | Priceman |
| 5,012,645 A | | 5/1991 | Reynolds |
| 5,207,053 A | | 5/1993 | Spadaccini et al. |
| 5,307,637 A | | 5/1994 | Stickles et al. |
| 5,355,668 A | | 10/1994 | Weil et al. |
| 5,472,795 A | * | 12/1995 | Atita .......................... 428/660 |
| 5,483,794 A | | 1/1996 | Nicoll et al. |
| 5,624,721 A | * | 4/1997 | Strangman ................. 427/585 |
| 5,683,825 A | * | 11/1997 | Bruce et al. ................ 428/698 |
| 5,705,229 A | * | 1/1998 | Abiven et al. .............. 427/431 |
| 5,758,504 A | | 6/1998 | Abreu et al. |
| 5,851,679 A | * | 12/1998 | Stowell et al. .............. 428/472 |
| 5,964,091 A | | 10/1999 | Fukui et al. |
| 5,998,003 A | | 12/1999 | Courtright et al. |
| 6,047,539 A | * | 4/2000 | Farmer ....................... 60/775 |
| 6,116,014 A | | 9/2000 | Dalla Betta et al. |
| 6,199,364 B1 | | 3/2001 | Kendall et al. |
| 6,201,029 B1 | | 3/2001 | Waycuilis |
| 6,207,295 B1 | * | 3/2001 | Stowell et al. .............. 428/615 |
| 6,210,791 B1 | * | 4/2001 | Skoog et al. ............ 106/286.5 |
| 6,253,540 B1 | | 7/2001 | Chew et al. |
| 6,254,756 B1 | * | 7/2001 | Maricocchi et al. .......... 205/97 |
| 6,413,589 B1 | * | 7/2002 | Li ............................ 427/376.6 |
| 6,503,441 B2 | * | 1/2003 | Corman et al. ............. 264/635 |
| 6,652,987 B2 | * | 11/2003 | Allen et al. ................. 428/622 |

* cited by examiner

*Primary Examiner*—Michael Koczo
(74) *Attorney, Agent, or Firm*—Jonathan P. Miller; Carmen Santa Maria; McNees Wallace & Nurick LLC

(57) ABSTRACT

A high temperature gas turbine component for use in the gas flow path that also is a specular optical reflector. A thin layer of a high temperature reflector is applied to the flow path surface of the component, that is, the surface of the component that forms a boundary for hot combustion gases. The component typically includes a thermal barrier coating overlying the high temperature metallic component that permits the component to operate at elevated temperatures. The thermal barrier coating must be polished in order to provide a surface that can suitably reflect the radiation into the gas flow path. A thin layer of the high temperature reflector then is applied over the polished thermal barrier coating by a process that can adequately adhere the reflector to the polished surface without increasing the roughness of the surface. The high temperature reflector can be applied to any surface aft of the compressor, such as on a combustor wall. The surface reflects radiation back into the hot gas flow path. The reflected radiation is not focused onto any other hardware component. The design of the component is such that the radiation is returned to the gas flow path rather than absorbed into a component wall which only serves to increase the temperature of the wall.

23 Claims, 3 Drawing Sheets

HIGH TEMPERATURE COMBUSTOR WALL FOR TEMPERATURE REDUCTION BY OPTICAL REFLECTION AND PROCESS FOR MANUFACTURING

CROSS-REFERENCE TO RELATED APPLICATIONS

This Application is related to application Ser. No. 10/335,657, filed contemporaneously with this Application on Dec. 31, 2002, entitled "IMPROVED HIGH TEMPERATURE SPLASH PLATE FOR TEMPERATURE REDUCTION BY OPTICAL REFLECTION AND PROCESS FOR MANUFACTURING" assigned to the assignee of the present invention and which is incorporated herein by reference, to application Ser. No. 10/335,647, filed contemporaneously with this Application on Dec. 31, 2002, entitled "IMPROVED HIGH TEMPERATURE CENTERBODY FOR TEMPERATURE REDUCTION BY OPTICAL REFLECTION AND PROCESS FOR MANUFACTURING" assigned to the assignee of the present invention and which is incorporated herein by reference, and to application Ser. No. 10/335,486, filed contemporaneously with this Application on Dec. 31, 2002, entitled "IMPROVED HIGH TEMPERATURE TURBINE NOZZLE FOR TEMPERATURE REDUCTION BY OPTICAL REFLECTION AND PROCESS FOR MANUFACTURING" assigned to the assignee of the present invention and which is incorporated herein by reference.

FIELD OF THE INVENTION

This invention is directed to gas turbine engines, and in particular, to modifications of components of such engines to reduce the temperature of boundary walls of the hot section portions of the components by optical reflection of radiation generated by combustion.

BACKGROUND OF THE INVENTION

In the compressor portion of an aircraft gas turbine engine, atmospheric air is compressed to 10–25 times atmospheric pressure, and adiabatically heated to 800°–1250° F. in the process. This heated and compressed air is directed into a combustor, where it is mixed with fuel. The fuel is ignited, and the combustion process heats the gases to very high temperatures, in excess of 3000° F. These hot gases pass through the turbine, where rotating turbine wheels extract energy to drive the fan and compressor of the engine, and the exhaust system, where the gases supply thrust to propel the aircraft. To improve the efficiency of operation of the aircraft engine, combustion temperatures have been raised. Of course, as the combustion temperature is raised, steps must be taken to prevent thermal degradation of the materials forming the flow path for these hot gases of combustion.

One well-known solution that has been undertaken to protect the metals that form the flow path for the hot gases of combustion have included application of protective layers having low thermal conductivity. These materials are applied as thermal barrier coating systems (TBCs), typically comprising a bond coat that improves adhesion of an overlying ceramic top coat, typically a stabilized zirconia. These systems are known to improve the thermal performance of the underlying metals that form the flow path in the hot section of the engine. However, as temperatures of combustion have increased, even these TBCs have been found to be insufficient.

Another solution that has been used in conjunction with TBCs is air cooling metal parts. Initially, impingement cooling provided a flow of air from the compressor to the back side of the metal parts comprising the gas flow path. As temperatures increased even further, serpentine passageways were formed in the metallic components and cooling air was circulated through the parts to provide additional cooling capability, the cooling air exiting through apertures positioned in the gas flow side of the component, providing an additional film layer along the gas flow path. Even though the air from the compressor is adiabatically heated to perhaps as high as 1250° F., the compressor air is still significantly cooler than the combustion gases moving along the gas flow path of the engine, and this air forms a barrier to protect the metal components from the hot combustion gases. However, as the temperatures of the combustion process have continued to increase, even these tried and true methods are reaching their limitations. The combustion temperatures are now sufficiently high that even the best superalloys coated in accordance with the prior art and outfitted with the well-known and elaborate cooling mechanisms exhibit shortened lives as a result of thermal degradation. In particular, the combustor liners of high efficiency, advanced cycle turbine engines are prone to failure as a result of thermal degradation.

While some modifications of the traditional flow path surfaces have been applied in the past, such as the application of materials over the TBC, these modifications have been directed to reducing the emissions of pollutants such as unburned hydrocarbons (UHC) and carbon monoxide (CO). One such modification is set forth in U.S. Pat. No. 5,355,668 to Weil et al., assigned to the assignee of the present invention, which teaches the application of a catalyst such as platinum, nickel oxide, chromium oxide or cobalt oxide directly over the flow path surface of the thermal barrier coating of a component such as a combustion liner. The catalyst layer, is applied to selected portions of flow path surfaces to catalyze combustion of fuel. The catalytic material is chosen to reduce air pollutants such as unburned hydrocarbons (UHC) and carbon monoxide (CO) resulting from the combustion process. The catalytic layer is applied to a thickness of 0.001 to 0.010 inches and is somewhat rough and porous, having a surface roughness of about 100–250 micro inches, in order to enhance the surface area available to maximize contact with the hot gases in order to promote the catalytic reaction. The rough surface assists in creating some turbulence that promotes contact the catalytic surface.

These prior art solutions are either directed to problems that are unrelated to the problem of high temperatures experienced by combustor walls, such as the Weil patent, or provide different solutions to the problem of high temperatures resulting from the combustion process. The present invention provides a different approach to the problem of high temperatures experienced by combustor walls.

SUMMARY OF THE INVENTION

The present invention is a high temperature gas turbine component for use in the gas flow path that also is a specular optical reflector. The gas turbine component is positioned in the hot section of the engine, behind the compressor section and reflects radiation from the combustor region back into the hot gas flow path. The reflected radiation is not focused onto any other hardware component so that the radiative heat passes into the turbine portion of the engine. The design of the component is such that the radiation is returned to the gas flow path rather than absorbed into a component wall which only serves to increase the temperature of the wall.

A thin layer of a high temperature reflector is applied to the flow path surface of the component, that is, the surface of the component that forms a boundary for hot combustion gases. The high temperature reflector must be applied as an optically smooth coating. The component typically includes a thermal barrier coating overlying the high temperature metallic component that permits the component to operate at elevated temperatures. The thermal barrier coating applied to the component typically is rough and must be polished in order to provide a sufficiently smooth surface that can suitably reflect the radiation into the gas flow path. A thin layer of the high temperature reflector then is applied by a process that can adequately adhere the reflector to the polished surface without increasing the roughness of the surface. The high temperature reflector can be applied to any surface aft of the compressor, but is most beneficially used in the combustor portion of the engine, for instance, the combustor wall, and the high pressure turbine portion of the engine. For military aircraft, the high temperature reflector would also be beneficially used in the augmentor portion of the engine.

An advantage of the present invention is that the radiation from the combustion process is reflected back into the gas flow path. This radiative heat, rather than being absorbed by the component, is absorbed by the fluid and carried back into portions of the engine that currently operate at cooler temperatures. The result is that the component does not become as hot. At a given temperature of operation of the engine, the component, because it is operating at a cooler temperature, will not deteriorate as rapidly due to thermal degradation.

Another advantage of the present invention is that the fluid stream will be heated to a higher temperature as the reflected radiation is absorbed by the fluid and carried from the combustor portion of the engine into the turbine portions of the engine. This increased temperature translates into increased engine efficiency, as the available energy in the fluid stream for both extraction by the turbine and for thrust is greater.

Still another advantage of the present invention is that the engine can be operated at an even higher temperature than currently experienced using the current invention if shortened lives of the component can be tolerated in exchange for even greater efficiency.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

In accordance with the present invention, components of a gas turbine engine which form the boundary of the gas flow path or which are located in the gas flow path are coated with a thin layer of a specular optical reflective material that has a high temperature capability.

Figure 1:
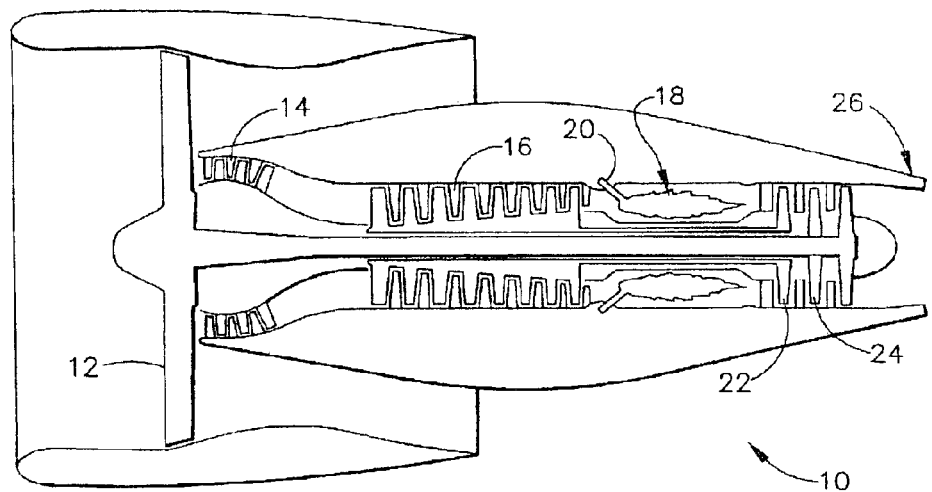
FIG. 1 is a schematic representation of a high bypass turbofan gas turbine engine.

A high bypass aircraft gas turbine engine 10 is shown schematically in FIG. 1. During operation, air is compressed in the fan 12, booster 14 and compressor 16 portions of the engine to 10–25 times atmospheric pressure, and adiabatically heated to 800°–1250° F. in the process. This heated and compressed air is directed into the combustor portion of the engine 18, where it is mixed with fuel supplied through a fuel nozzle system 20. The fuel is ignited, and the combustion process heats the gases to temperatures on the order of 3200°–3400° F. These hot gases pass through the high pressure 22 and low pressure 24 turbines, where rotating discs extract energy to drive the fan and compressor of the engine. The gases then are passed to the exhaust system 26, where they supply thrust to propel the aircraft.

Figure 2:
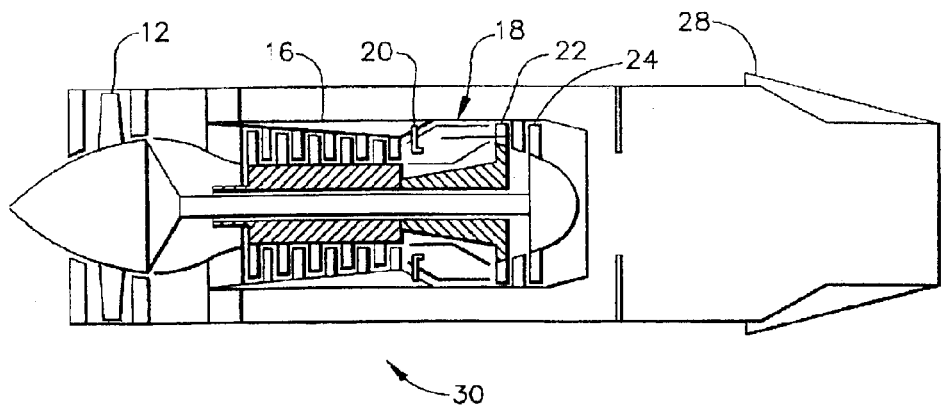
FIG. 2 is a schematic representation of a low bypass turbofan gas turbine engine equipped with an augmentor.

Operation of a low bypass gas turbine engine, shown schematically at 30 in FIG. 2, is similar, except that operational requirements may dictate omission of the booster 14 and addition of an augmentor 28 in the exhaust system shown at 26 in FIG. 1. To emphasize the conceptual similarity, the same identification numerals are employed in both figures.

Figure 3:
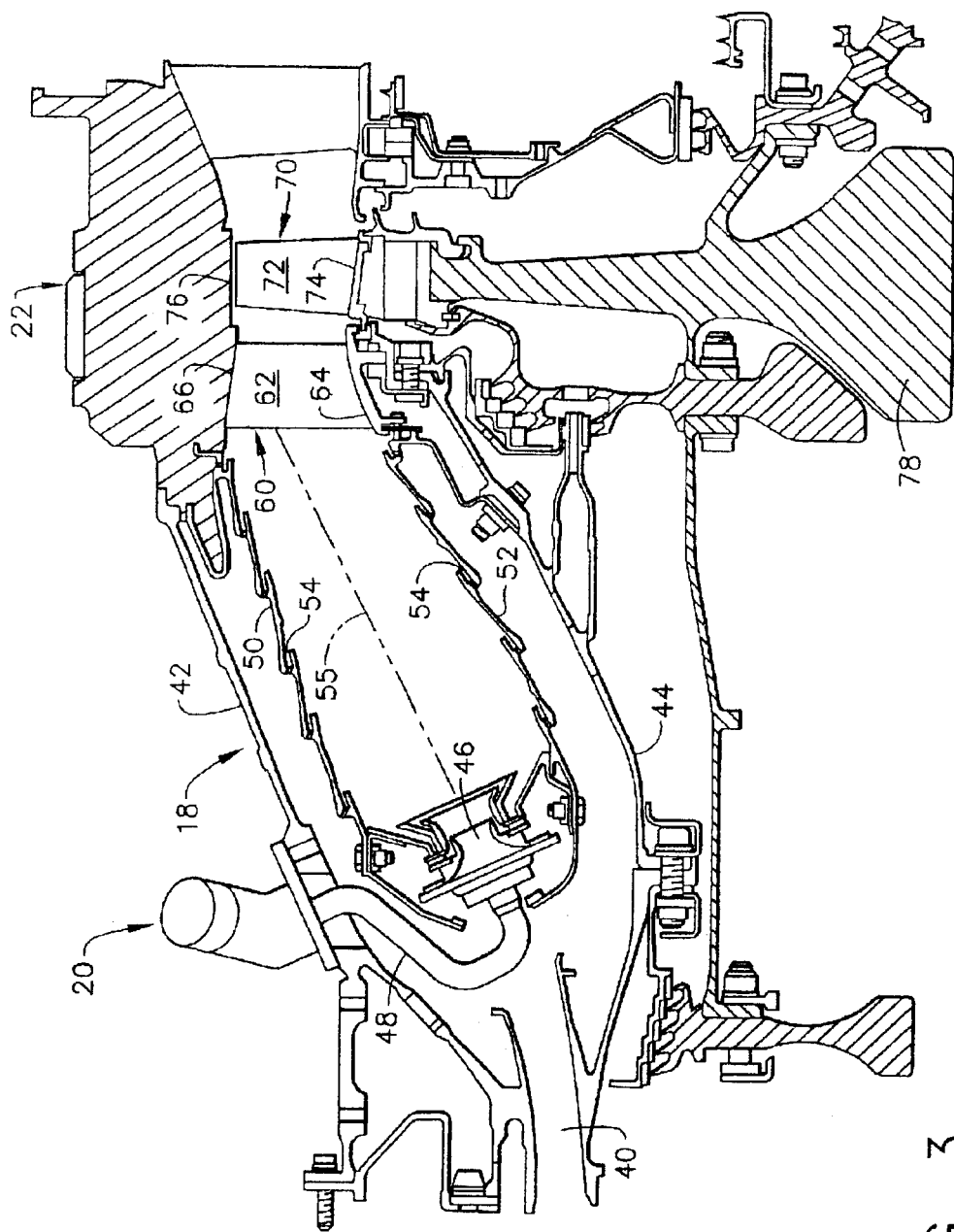
FIG. 3 is a schematic representation of the combustor section of a gas turbine engine.

The combustor 18 and high pressure turbine 22 sections of an engine such as in FIG. 1 or FIG. 2 are shown in greater detail in FIG. 3. For the purposes of this discussion, the combustor is presumed to be of annular configuration, as is common in the gas turbine art, but the concepts of the present invention are fully applicable to combustors of other configurations and designs. Compressed air from the compressor is introduced through a diffuser 40 into an annular cavity defined by outer combustor case 42 and the inner combustor case 44. A portion of the compressed air passes through a swirl nozzle 46, where it is mixed with fuel supplied through a fuel tube 48. The swirl nozzle and fuel tube are components of the fuel nozzle system 20. The fuel/air mixture is self-igniting under normal operating conditions, except for those transient conditions where flame instability or flame-out occurs. The flame is confined and directed toward the turbine by the outer combustor liner 50 and the inner combustor liner 52. These liners are oriented about a central axis 55 and are substantially symmetrical about this central axis 55 forming the gas flow path. Each combustor liner additionally is provided with a plurality of cooling holes 54, through which compressed air supplied by the compressor is forced to pass. The combustor liners 50 and 52 are described as having an inner side, facing the gaseous fluids and swirl nozzle, and an outer side, directly facing the combustor case and inner combustor case. As the temperature of the hot gas in the flow path can easily exceed the melting point of the materials forming the boundaries of the gas flow path, it is necessary to cool the components forming the flow path, first by passing the air coming from the compressor (at about 1000°–1250° F.) over the outer surfaces of the two liners, then by using the same air after it passes through the cooling holes 54 to direct a thin film of air between the inner surfaces of the liners and the hot gases. The thin film of air forming a boundary layer assists in protecting the combustor liners from being heated to even higher temperatures by a process referred to as film cooling. Additionally, the inner surfaces of the combustor liner are also coated with thermal barrier coating systems, which are comprised of a bond coat applied between an underlying superalloy base material and an overlying ceramic layer, to create a thermal barrier coating system that reduces the flow of heat to the substrate material.

The hot gases of combustion then leave the combustor and enter the high pressure turbine 22, which may comprise a single stage, as shown in FIG. 3, or multiple stages, each stage being comprised of a nozzle 60 and a rotor 70. The nozzle 60 is comprised of a plurality of vanes 62 disposed between and secured to an inner band 64 and an outer band 66. Vanes 62 are stationary. The rotor 70 is comprised of a plurality of blades, each having an airfoil section 72 and a platform 74, which are attached to the periphery of a rotating disk 78. Important associated structures to support the rotor are not shown. The blades cooperate with a stationary shroud 76 to effect a gas seal between rotor 70 and the stationary components of the engine. The gas flow path in this portion of the engine is defined upstream of the swirl nozzle 46 by the diffuser 40, the combustor case 42 and the inner combustor case 44. Downstream of the fuel nozzle 46, the gas flow path is defined by the inner surfaces of the inner combustor liner 52 and the outer combustor liner 50, and portions of the turbine or turbines including the inner and outer bands 64 and 66, the vanes 62, the airfoil 72 and platform 74 portions of the blades, the shrouds 76, as well as the exhaust system 26 and/or augmentor 28 aft or downstream of the turbine section of the engine. The present invention is specifically applicable to those components which define the gas flow path downstream of the swirl nozzle 46. Systems for providing cooling air and thermal barrier coating systems are known in the gas turbine engine art.

The turbine section of the engine and its component parts are cooled in a manner similar to that described above for combustor liners. Components of at least one turbine stage are often provided with cooling air through cooling holes. Additionally, the components exposed to hot gaseous downstream of the combustor may be provided with thermal barrier coating systems on their respective flow path surfaces. The thermal barrier coating systems can be used in conjunction with cooling holes for film cooling.

Materials employed in the combustor, turbine and exhaust system sections of aircraft gas turbines are typically high temperature superalloys based on nickel, cobalt, iron or combinations thereof. All of these superalloys are believed to be suitable substrate materials for the present invention. Also, monolithic ceramic materials and fiber reinforced ceramic matrix composite materials, described herein collectively as ceramic materials, may be employed in the combustor, turbine and exhaust systems sections of an aircraft gas turbine. Such ceramic materials are specifically included in the present invention, and may have slightly higher temperature limits than the high temperature superalloys used for combustors.

Even for gas turbine engines designed for commercial airliners, gas velocity through the engine may approach the speed of sound. Thus, the total gas residence time in the engine is but a small fraction of a second, during which time air coming through the compressor is mixed with liquid fuel, and combustion of the mixture occur. As the mixture is combusted to form a gas, heat, including radiant heat, is generated. Even with the most recent advances in cooling measures used in gas turbine engines such as active cooling controls and advanced thermal barrier coating systems which reduce the amount and/or rate of heat transferred to components due to convective and conductive heat transfer, the temperatures of the components along the flow path surface are still elevated to very high temperatures. The present invention assists in reducing the amount of heat transferred to these components by radiation transfer.

The present invention utilizes a high temperature specular optical reflector applied directly over existing thermal barrier systems utilized to protect the substrate material. These specular optical reflectors are applied as a very thin coating and in a manner so that they do not adversely affect the cooling holes in the surfaces of the components along the gas flow path. Conventional and well known techniques for applying thermal barrier coatings provide surfaces that are much too rough for the thin coatings to act as optical reflectors. When these coatings are applied over conventional thermal barrier coatings having surface finishes of 100 micro inches and greater, the rough surface causes the radiation to be scattered in a number of different directions. When the coatings are porous, such as when used for as a catalytic coating, the radiation can even be reabsorbed into the substrate, defeating its purpose as an optical reflector.

Figure 4:
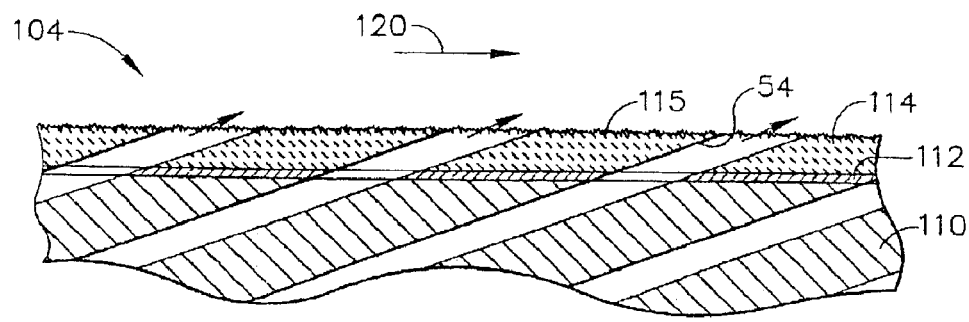
FIG. 4 is a cross-section of an as-manufactured combustor section of a gas turbine engine after application of a conventional thermal barrier system.

In one embodiment of the present invention, a combustion liner is manufactured in accordance with standard manufacturing methods. Referring to FIG. 4, liner 104 is comprised of a substrate 110 having high temperature capabilities. As discussed above, the substrate can be comprised of several materials. However, as illustrated in FIG. 4, substrate 110 is a high temperature nickel base superalloy. A bond coat 112 is applied over the nickel base alloy substrate. Overlying bond coat 112 is a ceramic layer 114 having a surface 115 that has a rough surface finish. As used herein, the term "rough surface finish" is one that is greater than about 100 micro inches. When the substrate is comprised of a different material, such as a ceramic matrix composite material, the bond coat 112 may be omitted.

Figure 5:
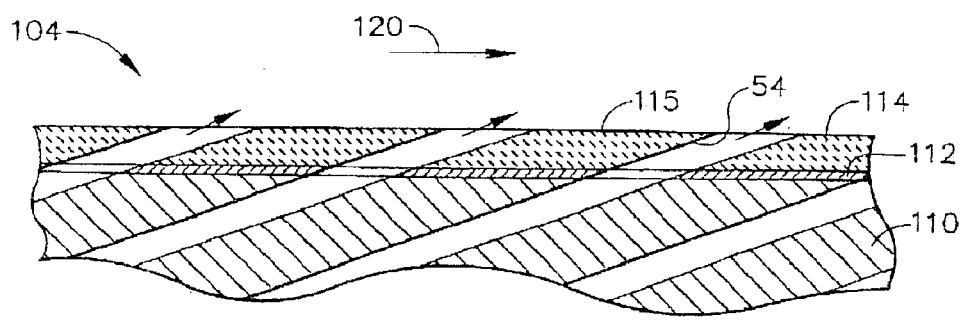
FIG. 5 is a cross-section of the combustor section of the gas turbine engine after the outer surface of the ceramic topcoat has been smoothed to achieve a surface finish of 50 micro inches or finer.

As manufactured, the surface finish of the thermal barrier coating system is usually too rough to act as a specular optical reflector. The outer surface of the liner, that is, the exposed surface of the thermal barrier coating overlying the substrate surface that forms the fluid boundary, is then polished. The tested liner was polished by hand using fine emery paper so that the surface 115 of the ceramic layer 114, as shown in FIG. 5, has a surface finish of no greater than about 50 micro inches, preferably about 32 micro inches and smoother. This exceptionally smooth surface is required to achieve the reflective properties required for the present invention to be effective. Additionally, the smooth surface assists in maintaining a smooth laminar-like flow of the cooling layer adjacent to the surface of the component by minimizing turbulence. In production, other well known polishing techniques such as lapper wheels with diamond paste and tumbling can be employed to speed the polishing process and increase throughput.

Figure 6:
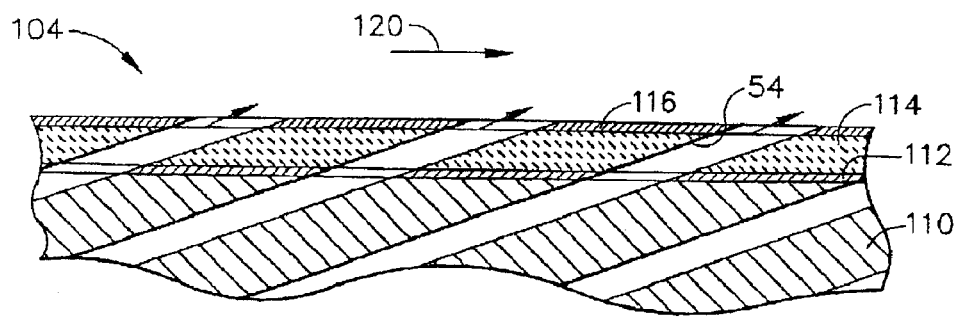
FIG. 6 is schematic representation of the optical reflector of the present invention applied over a smooth ceramic topcoat.

Next, the combustion liner is coated with a very thin specular reflective coating 116 of a material, as shown in FIG. 6, that will reflect the radiation away from the surface. A standard Ray-tracing program may be used to determine the areas requiring the coating. There may be surfaces which receive reflections from adjacent engine components to which the specular optical reflector has also been applied. The coating 116 is applied by a process that deposits material so that a very smooth surface finish is maintained. A preferred method is a chemical vapor deposition (CVD) process that deposits a coating to a thickness of about 40 microinches (1 micron). Other acceptable methods for depositing this thin, specular coating to a thickness of about 40 microinches (1 micron) include sputtering, liquid phase infiltration and physical vapor deposition. However, not all methods for depositing a coating produce coatings consistent with this invention. Other methods such as thermal spray methods do not produce an acceptable coating for specular reflection, as the coatings deposited by these processes are too thick and too rough.

A preferred coating material is platinum, although palladium or multiple dielectric mirrors made from tantalum oxide ($Ta_2O_5$), silica ($SiO_2$), titanium dioxide ($TiO_2$), and combinations of these materials can also be used. It is fundamental that the material used as a coating material remain highly reflective as the hot gas stream 120 passes over the surface. Thus, oxide scales cannot form, as the formation of these scales destroys the effectiveness of the coating as a reflector. Also, the very thin coating, in addition to being less expensive, is extremely adherent to the polished TBC, and, due to its thinness, does not peel off in layers, which can adversely affect the surface finish. The thin layer does not provide a severe weight penalty for the components to which it is added. In addition, the layer is maintained as a thin layer to allow the surface finish to be of high reflective, optical quality.

The present invention is described as applied to a combustor deflector. The combustor deflector is a convenient application, as the combustor deflector is symmetric about centerline 55 as shown in FIG. 3 and is substantially cylindrical or slightly conical. This is convenient as the radiation can be reflected from the specular reflective coating 116, shown in FIG. 6, back into hot gas stream 120, where the gas molecules absorb at least a portion of the radiation, as the gases flow toward the exhaust. The portion that is not absorbed is once again reflected at the opposite wall.

Testing has indicated that the specular reflective layer 116 reflects at least about 80% of the incident radiation, an amount of radiation sufficient to lower the temperature of a combustor section by about 100° F. when the temperature of a ceramic coating adjacent to the fluid stream is at about 2300° F. as compared to a component having a ceramic coating but without the specular reflective layer in a fluid stream at about 2300° F. The TBC polished to the surface finish set forth above displayed an improvement of 95° F., as measured by thermocouples attached to the deflectors in a high pressure sector test for approximately 100 hours, as compared to a substantially identical deflector that lacked the reflective coating of the present invention. As will be recognized by those skilled in the art, as the firing temperature of the engine increases, so does the benefit of the present invention. As the temperatures increase in advanced engines, an increasing fraction of the heat released appears as infrared radiation (IR) in accordance with Plank's Black-Body radiation law. Thus, advanced turbine engines will derive a greater benefit from the present invention, possibly greater than the improvement observed, as engine firing temperatures are increased.

While the present invention has been described as an improvement to a combustor, the present invention can be applied to any other surface along the gas flow path of the engine. For example, the specular reflective coating can be applied to the turbine blades, so that any incident radiation is reflected away from the blade and into the gas flow path. Because at least a portion of the energy is reflected from the components comprising the gas flow path, thereby lowering their temperature, the radiation is absorbed by the gases in the gas flow path, thereby raising its temperature.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A component having a specular reflective surface for use in a hot flow path of a gas turbine engine, the component comprising:
    a substrate material; and
    a specular reflective coating having a surface that forms a boundary for hot gaseous fluids of combustion, having a predetermined thickness overlying the substrate surface forming the hot boundary, the surface of the specular reflective material having an applied roughness of about 50 micro inches and smoother, and having a high temperature capability so that a surface of the specular reflective material reflects a least about 80% of incident radiation away from its surface to the gases in the hot flow path.

2. The component of claim 1 further including a ceramic material between the substrate material and the specular reflective coating, the ceramic material forming a thermal barrier overlying the substrate material, a surface of the ceramic material opposite the substrate and adjacent the the specular reflective coating having a surface roughness about 50 micro inches and smoother.

3. The component of claim 2 wherein the component is a combustor liner wherein the substrate material has a substantially conical configuration substantially symmetric about a center line, an inner surface that forms a boundary for a gas flow path and an outer surface opposite the gas flow surface.

4. The component of claim 2 wherein the component is a combustor liner wherein the substrate material has a substantially cylindrical configuration substantially symmetric about a center line, an inner surface that forms a boundary for a gas flow path and an outer surface opposite the gas flow surface.

5. The component of claim 2 wherein the surface of the ceramic material opposite the substrate and adjacent the specular reflective coating has a surface roughness of about 32 micro inches and smoother.

6. The component of claim 2 wherein the specular reflective coating is selected from the group of materials consisting of platinum, palladium and multiple dielectric mirrors comprising tantalum oxide ($Ta_2O_5$), silica ($SiO_2$), titanium dioxide ($TiO_2$), and combinations thereof.

7. The component of claim 2 wherein the coating is applied to a predetermined thickness of no greater than about 40 micro inches.

8. The component of claim 7 further characterized by a temperature performance improvement of about 100° F.

9. The component of claim 2 wherein the substrate material is a high temperature superalloy selected from the group consisting of nickel-based superalloys, iron-based superalloys, cobalt-based superalloys and combinations thereof.

10. The component of claim 1 wherein the substrate material is a high temperature ceramic matrix composite material.

11. A method for manufacturing a component having a specular reflective surface for use in a hot flow path of a gas turbine engine, the method comprising the steps of:

providing a component comprised of a substrate material having a surface; and applying a specular reflective coating over the surface to a predetermined thickness, the specular reflective coating having a surface that forms a boundary for hot gaseous fluids of combustion, the method for applying the coating providing a coating surface finish on a surface of the specular reflecting coating of about 50 micro inches and smoother, an outer surface of the specular reflective coating opposite a ceramic coating being exposed to gaseous fluids in the hot flow path of the engine.

12. The method of claim 11 further including the additional steps of applying a ceramic thermal barrier coating system over the substrate surface forming the hot fluid boundary; then mechanically working a surface of the ceramic coating overlying and opposite the substrate surface to obtain a surface finish of about 50 micro inches and smoother.

13. The method of claim 12 wherein the step of mechanically working the surface of the ceramic coating further includes obtaining a surface finish of about 32 micro inches and smoother.

14. The method of claim 12 wherein the step of mechanical working the surface of the ceramic coating includes polishing the surface.

15. The method of claim 14 wherein the step of polishing includes lapping.

16. The method of claim 12 wherein the step of mechanically working includes tumbling.

17. The method of claim 11 wherein the step of applying the specular reflective coating over the surface to a predetermined thickness includes applying the coating to a thickness of no greater than about 40 micro inches.

18. The method of claim 17 wherein the step of applying the specular reflective coating to a thickness of no greater than about 40 micro inches includes applying a coating selected from the group of materials consisting of platinum, palladium and multiple dielectric mirrors comprising tantalum oxide ($Ta_2O_5$), silica ($SiO_2$), titanium dioxide ($TiO_2$), palladium and combinations thereof.

19. The method of claim 18 wherein the specular reflective coating is applied by chemical vapor deposition.

20. The method of claim 18 wherein the specular reflective coating is applied by physical vapor deposition.

21. The method of claim 18 wherein the specular reflective coating is applied by liquid phase infiltration.

22. The method of claim 18 wherein the specular reflective coating is applied by sputtering.

23. A method for manufacturing a component having a specular reflective surface for use in a hot flow path of a gas turbine engine, the method comprising the steps of:

providing a component comprised of a substrate material;

applying a specular reflective coating over the surface of the substrate to a predetermined thickness, the method for applying the coating providing a coating surface finish of about 50 micro inches and smoother, an outer surface of the specular reflective coating opposite a ceramic coating over the substrate being exposed to gaseous fluids in the hot flow path of the engine; and hand polishing a surface of the ceramic coating overlying and opposite the substrate surface to obtain a surface finish of about 50 micro inches and smoother.

* * * * *

UNITED STATES PATENT AND TRADEMARK OFFICE
CERTIFICATE OF CORRECTION

PATENT NO. : 6,925,811 B2  
DATED : August 9, 2005  
INVENTOR(S) : Justis et al.

It is certified that error appears in the above-identified patent and that said Letters Patent is hereby corrected as shown below:

Column 8,
Line 31, "the the" should be -- the --.

Signed and Sealed this

Twenty-eighth Day of March, 2006

JON W. DUDAS
*Director of the United States Patent and Trademark Office*